(12) United States Patent
Wang et al.

(10) Patent No.: US 9,378,374 B2
(45) Date of Patent: Jun. 28, 2016

(54) METHOD AND DEVICE FOR PROMPTING PROGRAM UNINSTALLATION

(71) Applicant: Tencent Technology (Shenzhen) Company Limited, Shenzhen (CN)

(72) Inventors: Qing Wang, Shenzhen (CN); Hao Ran Guo, Shenzhen (CN); Yi Xia Yuan, Shenzhen (CN); Xun Chang Zhan, Shenzhen (CN); Chun You Lin, Shenzhen (CN); Peng Tao Li, Shenzhen (CN); Jia Shun Song, Shenzhen (CN)

(73) Assignee: TENCENT TECHNOLOGY (SHENZHEN) CO., LTD, Shenzhen (CN)

( * ) Notice: Subject to any disclaimer, the term of this patent is extended or adjusted under 35 U.S.C. 154(b) by 0 days.

(21) Appl. No.: 14/066,625

(22) Filed: Oct. 29, 2013

(65) Prior Publication Data

US 2014/0059691 A1 Feb. 27, 2014

Related U.S. Application Data

(63) Continuation of application No. PCT/CN2013/078895, filed on Jul. 5, 2013.

(30) Foreign Application Priority Data

Jul. 11, 2012 (CN) .......................... 2012 1 0239287

(51) Int. Cl.
*G06F 21/56* (2013.01)
*G06F 21/57* (2013.01)
*G06F 9/445* (2006.01)

(52) U.S. Cl.
CPC .............. *G06F 21/577* (2013.01); *G06F 8/62* (2013.01); *G06F 21/562* (2013.01)

(58) Field of Classification Search
None
See application file for complete search history.

(56) References Cited

U.S. PATENT DOCUMENTS

2009/0113414 A1 4/2009 Hamilton
2012/0222120 A1* 8/2012 Rim et al. ...................... 726/24

(Continued)

FOREIGN PATENT DOCUMENTS

| CN | 1617099 | 5/2005 |
| CN | 1874563 | 12/2006 |
| CN | 102253858 | 11/2011 |

OTHER PUBLICATIONS

International Search Report and Written Opinion mailed Oct. 17, 2013, directed to International Application No. PCT/CN2013/078895; 8 pages.

(Continued)

*Primary Examiner* — David Pearson
(74) *Attorney, Agent, or Firm* — Morrison & Foerster LLP

(57) ABSTRACT

The present disclosure discloses method and device for prompting program uninstallation and belongs to the field of the Internet. The method comprises: performing a security assessment of an application program installed on a mobile terminal, thereby obtaining a security assessment result; obtaining security identification information corresponding to the security assessment result based on pre-stored correlations between security assessment results and security identification information; establishing a correlation between the obtained security identification information and the application program, and displaying the correlation to a user. By performing a security assessment of an application program installed on a mobile terminal, obtaining security identification information, and establishing a correlation between the security identification information and the application program, a user can quickly uninstall and clean up malware with hidden security issues based on the security identification information, thereby safeguarding safe running of the mobile terminal.

23 Claims, 4 Drawing Sheets

(56) References Cited

U.S. PATENT DOCUMENTS

2012/0240236 A1* 9/2012 Wyatt et al. .................... 726/25
2013/0067378 A1* 3/2013 Au et al. ....................... 715/771

OTHER PUBLICATIONS

First Office Action dated Nov. 30, 2015, directed towards CA Application No. 2,862,046; 3 pages.

* cited by examiner

METHOD AND DEVICE FOR PROMPTING PROGRAM UNINSTALLATION

CROSS REFERENCE TO RELATED APPLICATIONS

This application is a U.S. continuation application under 35 U.S.C. §111(a) claiming priority under 35 U.S.C. §§120 and 365(c) to International Application No. PCT/CN2013/078895 filed Jul. 5, 2013, which claims the priority benefit of Chinese Patent Application No. 201210239287.4, filed Jul. 11, 2012, the contents of both the PCT application and Chinese application are incorporated by reference herein in their entirety for all purposes.

TECHNICAL FIELD

The present disclosure relates generally to the technological field of the Internet, and more particularly, to method and device for prompting program uninstallation.

BACKGROUND

With the development of mobile communication technology, especially the promotion and application of 3G networks and smart mobile terminals, there are currently more than a million mobile Internet application programs available to users. The great variety of application programs not only provides users with richer functions and fresher experiences, but also brings new challenges and tests to the operation of the mobile terminal systems. What concerns users the most is the issue of security.

On the one hand, due to the specificity and limitation associated with the hardware resource allocation in mobile terminals, users customarily install application software and system software together, resulting in instability in system operation. On the other hand, with wireless networks becoming more mature, and more networking applications becoming available, the security problems associated with the traditional Internet also appear in mobile Internet, and there are more and more malware such as viruses, Trojans, and worms, etc. When installed, such programs will bring significant risks to the mobile terminals, from stealing communication traffic, to more severely, stealing user information, or even breaking the mobile terminal system, which brings significant loss to users' property. How to quickly locate and uninstall unsafe application programs in mobile terminals and to ensure the security of mobile terminal systems have long become problems persons skilled in the art endeavor to address.

As illustrated in FIG. 1, the existing technology in mobile terminals provides a program management tool which can display the basic detailed information of all application programs installed in a mobile terminal, such as the name and size of each application program, and users can perform uninstallation according to the basic detailed information.

The existing technology comes with at least the following problem: the technology only provides a laundry list of the basic detailed information of the application programs installed in the mobile terminal, while users conduct uninstallation according to their own experiences. This tends to cause mis-operation very easily, and cannot clean up dangerous malware promptly.

SUMMARY OF THE DISCLOSURE

In order to help users clean dangerous malware, the present disclosure provides method and device for prompting program uninstallation.

According to one aspect of the present disclosure, a method of prompting program uninstallation can comprise:

Performing a security assessment of an application program installed on a mobile terminal, thereby obtaining a security assessment result;

Obtaining security identification information corresponding to the security assessment result based on pre-stored correlations between security assessment results and security identification information;

Establishing a correlation between the obtained security identification information and the application program, and displaying the correlation to a user.

Performing a security assessment of an application program installed on a mobile terminal can comprise:

Obtaining attribute information of the application program installed on the mobile terminal; and Performing the security assessment of the application program based on the obtained attribute information.

Obtaining security identification information corresponding to the obtained security assessment result based on pre-stored correlations between security assessment results and security identification information can comprise:

Obtaining any security identification corresponding to the obtained security assessment result, wherein the correlations between security assessment results and security identification information can be such that one security assessment result corresponds to one or more security identifications.

Correlations between security assessment results and security identification information can be pre-stored locally on a mobile terminal. Alternatively, correlations between security assessment results and security identification information can be pre-stored on a network terminal.

Multiple application programs can be installed on a mobile terminal, in which case, the method of prompting program uninstallation can further comprise, after displaying the correlation between the obtained security identification information and the application program to the user:

Setting a selection box for each application program; and

Displaying to the user each application program and its corresponding selection box.

A security assessment result can comprise security level information and/or security description information. Security identification information can comprise icon information, text information and/or sound information.

Another aspect of the present disclosure provides a device that prompts program uninstallation. The device can comprise:

An assessment module that performs a security assessment of an application program installed on a mobile terminal, thereby obtaining a security assessment result;

An obtaining module that obtains security identification information corresponding to the security assessment result obtained by the assessment module, based on pre-stored correlations between security assessment results and security identification information; and A display module that establishes a correlation between the obtained security identification information and the application program, and displays the correlation to a user.

The assessment module can comprise:

An obtaining unit that obtains attribute information of an application program installed on a mobile terminal; and An assessment unit that performs a security assessment of the application program based on the attribute information obtained by the obtaining unit, thereby obtaining a security assessment result.

Correlations between security assessment results and security identification information can be such that one security assessment result corresponds to one or more security identifications. The obtaining module can obtain any security identification corresponding to a security assessment result.

Correlations between security assessment results and security identification information can be pre-stored locally on a mobile terminal. Alternatively, correlations between security assessment results and security identification information can be pre-stored on a network terminal.

The device can further comprise a selection box setting module that sets a selection box for each application program when multiple application programs are installed on a mobile terminal, and displays each application program and its corresponding selection box to a user.

A security assessment result can comprise security level information and/or security description information. Security identification information can comprise icon information, text information and/or sound information.

The beneficial effects brought about by the technical solutions provided by the present disclosure include the following: by performing a security assessment of an application program installed on a mobile terminal, security identification information can be obtained and an identification correlation between the security identification information and the application program can be established. A user can quickly uninstall and clean up malware with hidden security issues based on the security identification information, thereby safeguarding safe running of the mobile terminal. In addition, the present disclosure provides a method of multiple interactions which enable a user to clean up multiple malware in one go, thereby improving the efficiency of uninstallation and enhancing user experience.

DETAILED DESCRIPTION

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Examples of mobile terminals that can be used in accordance with various embodiments include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to those skilled in the art.

Figure 1:
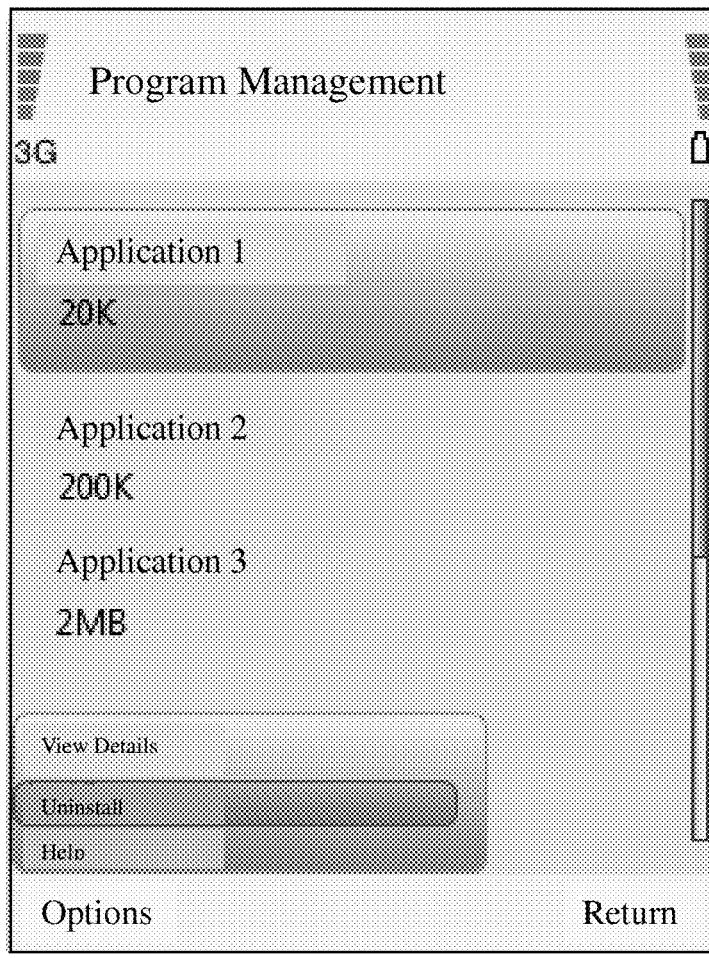
FIG. 1 is a schematic diagram illustrating an example of the screen of a mobile terminal displaying program uninstallation prompt according to the existing technology.
Figure 2:
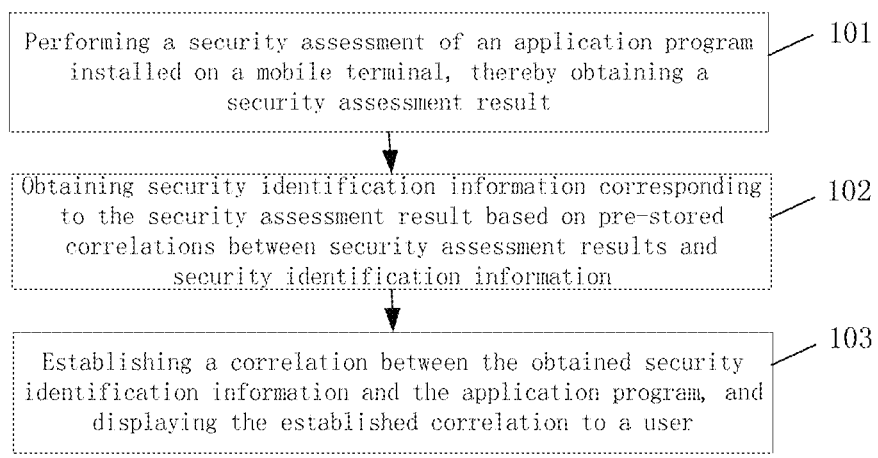
FIG. 2 is a schematic diagram illustrating an example of the flow of a method of prompting program uninstallation according to various embodiments.

FIG. 2 is a schematic diagram illustrating an example of the flow of a method of prompting program uninstallation according to various embodiments. The method can comprise:

Step 101: performing a security assessment of an application program installed on a mobile terminal, thereby obtaining a security assessment result;

Step 102: obtaining security identification information corresponding to the security assessment result based on pre-stored correlations between security assessment results and security identification information;

Step 103: establishing a correlation between the obtained security identification information and the application program, and displaying the established correlation to a user.

According to some embodiments, performing a security assessment of an application program installed on a mobile terminal can comprise:

Obtaining attribute information of the application program installed on the mobile terminal; and Performing the security assessment of the application program based on the obtained attribute information.

According to some embodiments, correlations between security assessment results and security identification information are such that one security assessment result corresponds to one or more security identifications. According to these embodiments, obtaining security identification information corresponding to a security assessment result based on pre-stored correlations between security assessment results and security identification information can comprise:

Obtaining any security identification corresponding to the security assessment result.

According to some embodiments, correlations between security assessment results and security identification information are pre-stored locally on a mobile terminal. According to some other embodiments, correlations between security assessment results and security identification information are pre-stored on a network terminal.

According to some embodiments, multiple application programs can be installed on a mobile terminal. According to these embodiments, the method of prompting program uninstallation can further comprise, after displaying the correlation between the obtained security identification information and the application program to the user:

Setting a selection box for each application program; and

Displaying to the user each application program and its corresponding selection box.

According to some embodiments, a security assessment result can comprise security level information and/or security description information. According to some embodiments, security identification information can comprise icon information, text information and/or sound information.

The embodiments illustrated in FIG. 2 provide a method to perform a security assessment of an application program installed on a mobile terminal so as to obtain security identification information and establish an identification correlation between the security identification information and the application program. A user can quickly uninstall and clean up malware with hidden security issues based on the security identification information, thereby safeguarding safe running of the mobile terminal.

In cases where application programs are installed on a mobile terminal, after performing security assessments of the application programs and prompting to a user security information of the application programs in the form of security identifications based on security assessment results, a user can uninstall and clean up malware based on a security identification prompted by the mobile terminal, thereby safeguarding safe running of the mobile terminal.

Figure 3:
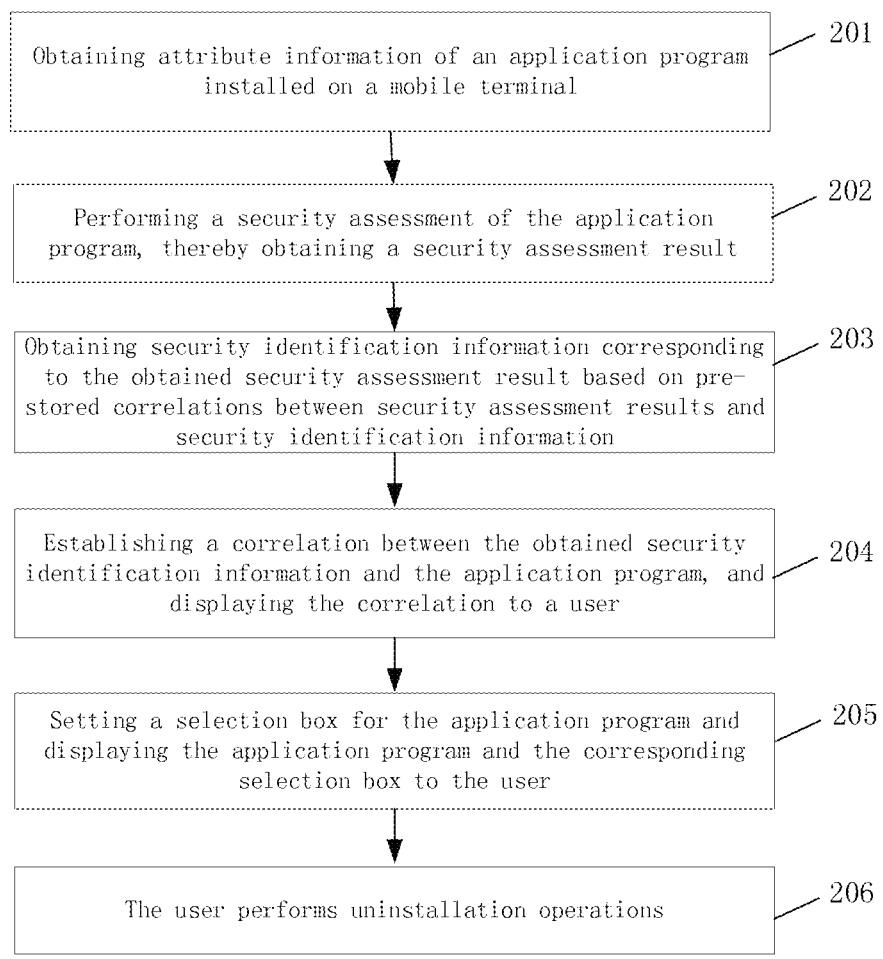
FIG. 3 is a schematic diagram illustrating an example of the flow of a method of prompting program uninstallation according to various embodiments.

FIG. 3 is a schematic diagram illustrating an example of the flow of a method of prompting program uninstallation according to various embodiments. The method can comprise:

Step 201: obtaining attribute information of an application program installed on a mobile terminal.

According to some embodiments, the attribute information of the application program installed on the mobile terminal can be obtained by a device that prompts program uninstallation. According to some embodiments, the attribute information can comprise such information as name, size and installation location of an application program.

According to some embodiments, when multiple application programs are installed on a mobile terminal, attribute information of each of the application programs can be obtained, security assessments of the application programs based on the attribute information corresponding to each application program can be performed, and the attribute information of each of the application programs can be displayed to a user to be used as a prompt for application program uninstallation for the user's reference. After the prompt is displayed, the user can enter a command into the mobile terminal instructing that the application program uninstallation proceed. The security assessment of an application program based on the attribute information of the application program can then be performed after the user enters the command. According to some embodiments, attribute information of each application program can be displayed in the form of a list.

Step 202: performing a security assessment of the application program, thereby obtaining a security assessment result.

According to some embodiments, security assessments can be performed in a device that prompts program uninstallation. By way of example only, an assessment module can be set up in the device, and the assessment module can perform security assessments of application programs based on the obtained attribute information. The present disclosure is not limited to any specific way by which the assessment can be achieved. A security assessment result obtained by the assessment module can comprise security level information and/or security description information. Security level information can comprise such levels as danger, warning, and safe, etc., and security description information can comprise such information as high level security, low level security, and very unsafe, etc.

According to some embodiments, a device that prompts program uninstallation can establish a communication connection with a mobile terminal, send the obtained attribute information of the application program to the mobile terminal through the communication connection with the mobile terminal for the mobile terminal to perform a security assessment, and obtain the most current security assessment result from the mobile terminal in real time.

Step 203: obtaining security identification information corresponding to the security assessment result based on pre-stored correlations between security assessment results and security identification information.

According to some embodiments, correlations between security assessment results and security identification information are such that one security assessment result corresponds to one security identification. According to some other embodiments, correlations between security assessment results and security identification information are such that one security assessment result corresponds to a plurality of security identifications. According to these embodiments, obtaining security identification information corresponding to a security assessment result can comprise obtaining any security identification corresponding to the security assessment result.

By way of example only, if a security assessment result is "safe," then, based on the correlations, the device can read security identification information corresponding to a safety level, such as a safety icon or a safety prompt, etc. If a security assessment result is "high-risk virus," then, based on the correlations, the device can read security identification information comprising a danger icon or a danger prompt, etc.

According to some embodiments, correlations between security assessment results and security identification information are pre-stored locally on a mobile terminal. According to some other embodiments, correlations between security assessment results and security identification information are pre-stored on a network terminal.

If the correlations are pre-stored on a mobile terminal itself, when obtaining the security identification information, a device that prompts program uninstallation can obtain the pre-stored correlations from the mobile terminal, and obtain security identification information corresponding to a security assessment result based on the correlations.

If the correlations are stored on a network terminal, when obtaining the security identification information, a device that prompts program uninstallation can send a security assessment result to the network terminal. After receiving the security assessment result, the network terminal can obtain the security identification information corresponding to the security assessment result based on correlations pre-stored on itself or updated on a real-time basis, and send the security identification information to the device that prompts program uninstallation. These embodiments do not require that a device that prompts program uninstallation have large storage capacity. When obtaining security identification information, as long as the security assessment result has been sent to the network terminal, the security identification information can be returned from the network terminal and received by the device.

According to some embodiments, if the correlations are pre-stored on a network terminal, when obtaining the security identification information, a device that prompts program uninstallation can send a command to the network terminal to obtain the correlations between security assessment results and security identification information stored on the network terminal. After receiving the command, the network terminal can send the correlations pre-stored on itself or updated on a real-time basis to the device that prompts program uninstallation. After receiving the correlations, the device that prompts program uninstallation can obtain the security identification information corresponding to a security assessment result based on the security assessment result and the correlations. According to these embodiments, the correlations thus stored on the device that prompts program uninstallation can comprise the most updated correlations and security identification information.

Step 204: establishing a correlation between the obtained security identification information and the application program, and displaying the correlation to a user.

According to some embodiments, security identification information is added to the application program through establishing the correlation between the obtained security identification information and the application program.

According to some embodiments, the attribute information of the application program obtained in Step 201 can also be displayed to the user. Displaying the attribute information to the user enables the user to understand the basic information of the application program.

Figure 4:
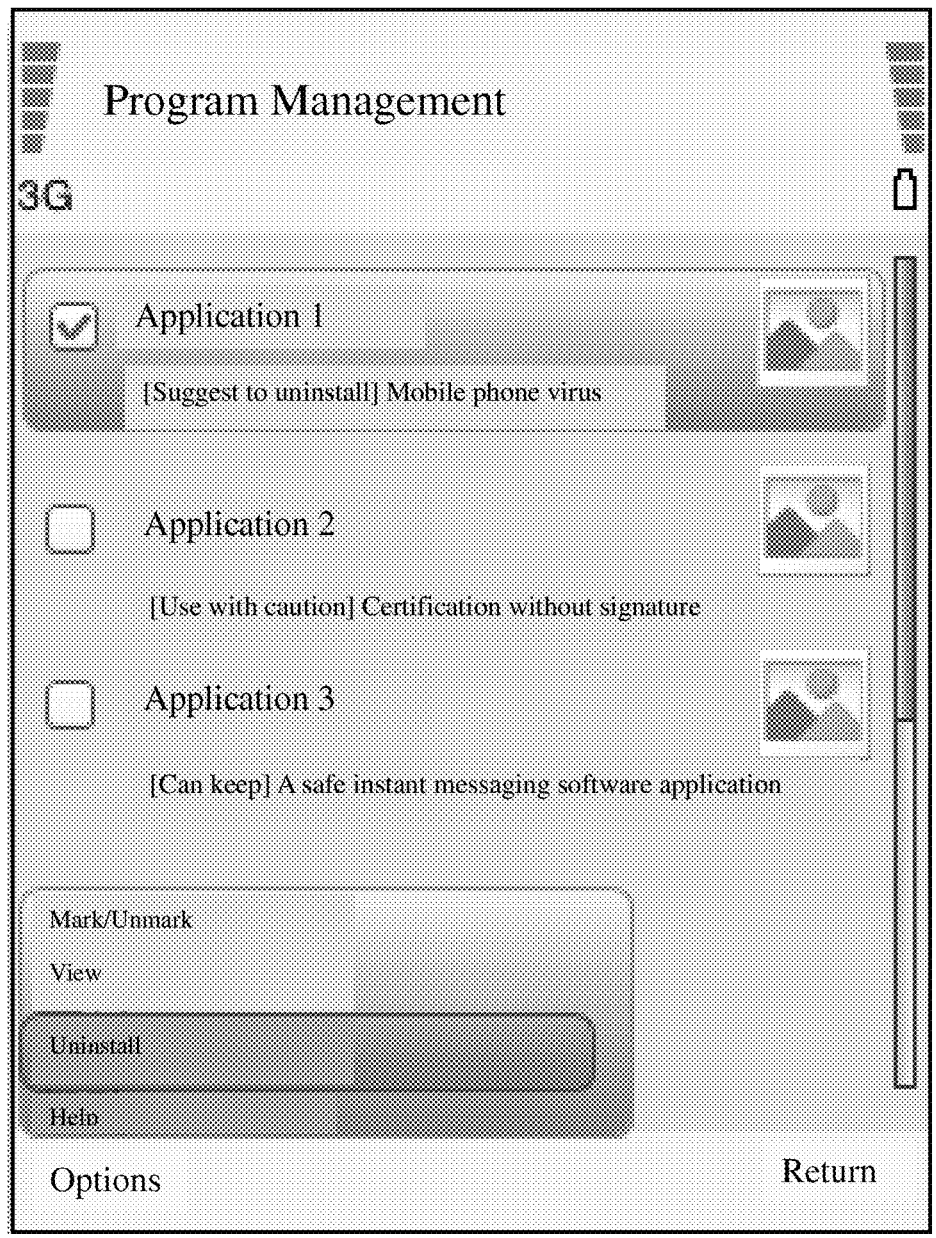
FIG. 4 is a schematic diagram illustrating an example of the screen of a mobile terminal displaying program uninstallation prompt according to various embodiments.

FIG. 4 is a schematic diagram illustrating an example of the screen of a mobile terminal displaying program uninstallation prompt according to various embodiments. As illustrated in FIG. 4, security identification information according to various embodiments can comprise icon information, text information and/or sound information. The icon information can comprise danger icon information, warning icon information and safety icon information, etc. The text information can comprise prompting text or security description text. Examples of prompting texts include, but are not limited to, "suggest to uninstall," "OK to keep" etc. Examples of security description texts include, but are not limited to, "The application program is a virus," "The application program does not have a signature certificate; use with caution," "Safe application program; OK to keep," etc. The sound information can be used to prompt users and guide users to perform uninstallation operations.

Step 205: setting a selection box for the application program and displaying the application program and its corresponding selection box to the user.

This step is an optional but preferred step. When multiple application programs are installed on a mobile terminal, a selection box can be set up for each application program and displayed to a user. The user can select multiple selection boxes corresponding to multiple application programs all at once when uninstalling the programs and clean up the application programs in one go. This reduces the number of user interactions with the mobile terminal, improves the efficiency of uninstallation, and instructs the user to quickly finish program uninstallation operations.

The present disclosure is not limited to specific locations of the selection boxes and specific forms in which they are displayed. According to some embodiments, a selection box can be placed in front of or after each application program to facilitate a user to mark and select the application programs.

According to some embodiments, an application program can be checked and selected by default based on the security assessment result obtained in Step 202 above. That is, when displaying the application programs and the corresponding selection boxes to a user, selection boxes corresponding to malware are set to be checked and selected by default. When the user is uninstalling programs, she can directly uninstall all of the programs that have been checked and selected by default in one go.

Step 206: the user performs uninstallation operations.

According to some embodiments, based on the application programs, the security identification information and/or the selection boxes displayed by a device that prompts program uninstallation, a user can understand the security status of various application programs, uninstall multiple application programs in one go, and safely uninstall the programs to promptly reduce potential security risks associated with a mobile terminal.

The present disclosure provides a method to perform a security assessment of an application program installed on a mobile terminal so as to obtain security identification information and establish an identification correlation between the security identification information and the application program. A user can quickly uninstall and clean up malware with hidden security issues based on the security identification information, thereby safeguarding safe running of the mobile terminal. In addition, the present disclosure provides a method of multiple interactions which enable a user to clean up multiple malware in one go, thereby improving the efficiency of uninstallation and enhancing user experience.

Figure 5:
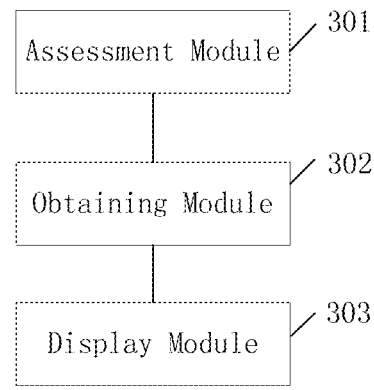
FIG. 5 is a schematic diagram illustrating an example of an arrangement of a device that prompts program uninstallation according to various embodiments.

FIG. 5 is a schematic diagram illustrating an example of an arrangement of a device that prompts program uninstallation according to various embodiments. The device can comprise:

An assessment module 301 that performs a security assessment of an application program installed on a mobile terminal, thereby obtaining a security assessment result;

An obtaining module 302 that obtains security identification information corresponding to the security assessment result obtained by the assessment module, based on pre-stored correlations between security assessment results and security identification information; and A display module 303 that establishes a correlation between the obtained security identification information and the application program, and displays the correlation to a user.

According to some embodiments, the assessment module 301 can comprise an obtaining unit and an assessment unit. The obtaining unit can obtain attribute information of an application program installed on a mobile terminal. The assessment unit can perform a security assessment of the application program based on the attribute information obtained by the obtaining unit and obtain a security assessment result.

According to some embodiments, correlations between security assessment results and security identification information are such that one security assessment result corresponds to one or more security identifications. The obtaining module 302 can obtain any security identification corresponding to a security assessment result.

According to some embodiments, correlations between security assessment results and security identification information are pre-stored locally on a mobile terminal. According to some other embodiments, correlations between security assessment results and security identification information are pre-stored on a network terminal.

Figure 6:
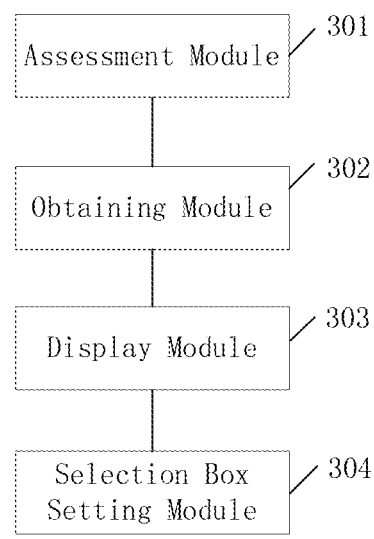
FIG. 6 is a schematic diagram illustrating an example of an arrangement of a device that prompts program uninstallation according to various embodiments.

According to some embodiments, the device can additionally comprise a selection box setting module 304, as illustrated in FIG. 6. The selection box setting module can set a selection box for each application program when multiple application programs are installed on a mobile terminal, and display each application program and its corresponding selection box to a user.

According to some embodiments, a security assessment result can comprise security level information and/or security description information. According to some embodiments, security identification information can comprise icon information, text information and/or sound information.

The present disclosure provides a device that performs a security assessment of an application program installed on a mobile terminal so as to obtain security identification information and establish an identification correlation between the security identification information and the application program. A user can quickly uninstall and clean up malware with hidden security issues based on the security identification information, thereby safeguarding safe running of the mobile terminal. In addition, the present disclosure provides a method of multiple interactions which enable a user to clean up multiple malware in one go, thereby improving the efficiency of uninstallation and enhancing user experience.

When a device that prompts program uninstallation prompts the uninstallation of programs, allocation of functional modules does not have to be exactly the same as the allocation described above. In practice, the functions described above can be achieved by different functional module assignments based on actual needs. That is, the internal structure of a device can be allocated into different functional modules so as to achieve all or part of the functions described above. In addition, the device that prompts program uninstallation is of the same concept as the methods for prompting program uninstallation described above. Therefore, the device can be used to carry out the above-described methods.

Persons of ordinary skill in the art can readily appreciate that all or part of the steps of the methods described in the embodiments above can be executed by relevant hardware instructed by a program that may be stored in a computer-readable memory medium. The readable memory medium may be, for example, a read-only memory ("ROM"), a random access memory ("RAM"), a magnetic disk or a compact disc.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A method of prompting program uninstallation, comprising:
   obtaining a security assessment result associated with a security assessment of an application program installed on a mobile terminal,
   obtaining security identification information corresponding to the security assessment result based on correlations between security assessment results and security identification information,
   establishing a correlation between the obtained security identification information and the application program, and
   displaying the established correlation on the mobile terminal, wherein obtaining the security assessment result comprises:
   obtaining attribute information of the application program installed on the mobile terminal,
   sending the obtained attribute information of the application program to the mobile terminal, thereby allowing the mobile terminal to perform the security assessment of the application program based on the attribute information of the application program, and
   receiving the security assessment result from the mobile terminal.

2. The method of claim 1, wherein obtaining the security assessment result comprises:
   performing the security assessment of the application program based on the obtained attribute information.

3. The method of claim 2, comprising, after obtaining the attribute information of the application program installed on the mobile terminal and before performing the security assessment of the application program based on the obtained attribute information,
   displaying the obtained attribute information as a prompt for application program uninstallation, and
   receiving a user command instructing that the application program uninstallation proceed.

4. The method of claim 3, wherein the application program is one of multiple application programs installed on the mobile terminal, and attribute information of each application program, including the attribute information of the application program, is displayed in the form of a list.

5. The method of claim 1, wherein the attribute information comprises information selected from the group consisting of: name, size and installation location of the application program.

6. The method of claim 1, wherein the correlations between security assessment results and security identification information are such that one security assessment result corresponds to one or more security identifications, and obtaining the security identification information corresponding to the security assessment result based on the correlations between security assessment results and security identification information comprises:
   obtaining any security identification corresponding to the security assessment result.

7. The method of claim 1, wherein the correlations between security assessment results and security identification information are pre-stored locally on the mobile terminal.

8. The method of claim 1, wherein the correlations between security assessment results and security identification information are stored on a network terminal.

9. The method of claim 8, wherein the correlations between security assessment results and security identification information are pre-stored on the network terminal.

10. The method of claim 8, wherein the correlations between security assessment results and security identification information are updated on the network terminal on a real-time basis.

11. The method of claim 1, wherein the application program is one of multiple application programs installed on the mobile terminal, the method comprising:
    setting a selection box for each application program, and
    displaying each application program and its corresponding selection box.

12. The method of claim 1, wherein the security assessment result comprises information selected from the group consisting of: security level information and security description information.

13. The method of claim 1, wherein the security identification information comprises information selected from the group consisting of: icon information, text information, and sound information.

14. A device that prompts program uninstallation, comprising:
    an assessment module that performs a security assessment of an application program installed on a mobile terminal and obtains a security assessment result, the security assessment result comprising attribute information of the application program installed on the mobile terminal,
    an obtaining module that obtains security identification information corresponding to the security assessment result obtained by the assessment module, based on correlations between security assessment results and security identification information, a display module that establishes a correlation between the obtained security identification information and the application program and displays the established correlation, a sending module that sends the obtained attribute information of the application program to the mobile terminal, thereby allowing the mobile terminal to perform the security assessment of the application program based on the attribute information of the application program, and a receiving module that receives the security assessment result from the mobile terminal.

15. The device of claim 14, wherein the assessment module comprises:

an obtaining unit that obtains attribute information of the application program installed on the mobile terminal, and an assessment unit that performs the security assessment of the application program based on the attribute information obtained by the obtaining unit, thereby obtaining the security assessment result.

16. The device of claim 14, wherein the application program is one of multiple application programs installed on the mobile terminal, the device comprising:

a selection box setting module that sets a selection box for each application program and displays each application program and its corresponding selection box.

17. The device of claim 14, wherein the correlations between security assessment results and security identification information are such that one security assessment result corresponds to one or more security identifications, and the obtaining module obtains any security identification corresponding to the security assessment result.

18. The device of claim 14, wherein the correlations between security assessment results and security identification information are pre-stored locally on the mobile terminal.

19. The device of claim 14, wherein the correlations between security assessment results and security identification information are pre-stored on a network terminal.

20. The device of claim 14, wherein the correlations between security assessment results and security identification information are updated on the network terminal on a real-time basis.

21. A method of prompting program uninstallation, comprising:

obtaining a security assessment result associated with a security assessment of an application program installed on a mobile terminal, obtaining security identification information corresponding to the security assessment result based on correlations between security assessment results and security identification information, establishing a correlation between the obtained security identification information and the application program, and displaying the established correlation on the mobile terminal, wherein the correlations between security assessment results and security identification information are pre-stored locally on the mobile terminal, and obtaining the security identification information corresponding to the security assessment result based on the correlations between security assessment results and security identification information comprises:

receiving the correlations between security assessment results and security identification information from the mobile terminal, and obtaining the security identification information corresponding to the security assessment result based on the received correlations between security assessment results and security identification information.

22. A method of prompting program uninstallation, comprising:

obtaining a security assessment result associated with a security assessment of an application program installed on a mobile terminal, obtaining security identification information corresponding to the security assessment result based on correlations between security assessment results and security identification information, establishing a correlation between the obtained security identification information and the application program, and displaying the established correlation on the mobile terminal, wherein the correlations between security assessment results and security identification information are stored on a network terminal, and obtaining the security identification information corresponding to the security assessment result based on the correlations between security assessment results and security identification information comprises:

sending the security assessment result to the network terminal, thereby allowing the network terminal to obtain the security identification information corresponding to the security assessment result based on the correlations between security assessment results and security identification information stored on the network terminal, and receiving the security identification information corresponding to the security assessment result from the network terminal.

23. A method of prompting program uninstallation, comprising:

obtaining a security assessment result associated with a security assessment of an application program installed on a mobile terminal, sending a command to a network terminal storing correlations between security assessment results and security identification information, receiving the correlations between security assessment results and security identification information from the network terminal, obtaining security identification information corresponding to the security assessment result based on the received correlations between security assessment results and security identification information, establishing a correlation between the obtained security identification information and the application program, and displaying the established correlation on the mobile terminal.

* * * * *